United States Patent
VonThenen (10) Patent No.: US 9,665,583 B1
(45) Date of Patent: May 30, 2017

(54) READ-WRITE ACCESS IN A READ-ONLY ENVIRONMENT

(71) Applicant: EMC Corporation, Hopkinton, MA (US)

(72) Inventor: David VonThenen, Aliso Viejo, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 205 days.

(21) Appl. No.: 13/966,009

(22) Filed: Aug. 13, 2013

Related U.S. Application Data (60) Provisional application No. 61/812,679, filed on Apr. 16, 2013.

(51) Int. Cl.
  *G06F 17/00* (2006.01)
  *G06F 17/30* (2006.01)
  *G06F 3/06* (2006.01)

(52) U.S. Cl.
  CPC ........ *G06F 17/30091* (2013.01); *G06F 3/064* (2013.01)

(58) Field of Classification Search
  CPC .................................................... G06F 3/064
  USPC ....... 707/641, 644, 781, 829, 626, 640, 823; 711/154
  See application file for complete search history.

(56) References Cited

U.S. PATENT DOCUMENTS

| | | | |
|---|---|---|---|
| 7,757,056 B1* | 7/2010 | Fair | G06F 3/0605 711/162 |
| 8,065,479 B2 | 11/2011 | Humlicek | |
| 8,124,367 B2* | 2/2012 | Horsewood | A61B 5/00 422/411 |
| 8,214,367 B2* | 7/2012 | Baratto | G06F 9/4443 707/648 |
| 8,234,468 B1 | 7/2012 | Deshmukh et al. | |
| 8,966,188 B1* | 2/2015 | Bardale | 711/147 |
| 9,152,342 B1 | 10/2015 | VonThenen | |
| 2012/0203808 A1* | 8/2012 | Larimore | G06F 9/45537 707/827 |
| 2013/0339301 A1* | 12/2013 | Saito et al. | 707/649 |
| 2013/0339954 A1* | 12/2013 | Tsirkin | G06F 9/45558 718/1 |
| 2015/0046401 A1 | 2/2015 | Xing | |

(Continued)

OTHER PUBLICATIONS

U.S. Appl. No. 13/966,065, Jul. 24, 2015, US Notice of Allowance.

(Continued)

*Primary Examiner* — Marc Filipczyk
(74) *Attorney, Agent, or Firm* — Workman Nydegger (57) ABSTRACT

In one example, a method for facilitating read-write processes in a read-only environment includes intercepting a write request directed to read-only data, the write request including a data block. A file object construct is then created that is representative of the read-only data, and the file object construct is stored in association with a unique identifier. The data block of the write request is written to a data structure so that the data block is mapped to the file object construct. The file object construct, when retrieved, includes a representation of the read-only data modified in accordance with the write request, but no change is required to be made to the underlying read-only data.

16 Claims, 9 Drawing Sheets

(56) References Cited

U.S. PATENT DOCUMENTS

2015/0193350 A1    7/2015  Zhu

OTHER PUBLICATIONS

U.S. Appl. No. 13/966,163, Aug. 11, 2015, US Notice of Allowance.
U.S. Appl. No. 14/875,546, Jan. 4, 2016, Office Action.
U.S. Appl. No. 14/875,546, Apr. 20, 2016, Notice of Allowance.

* cited by examiner

READ-WRITE ACCESS IN A READ-ONLY ENVIRONMENT

RELATED APPLICATIONS

This application claims priority to U.S. Provisional Patent Application Ser. No. 61/812,679, entitled READ WRITE ACCESS IN A READ ONLY ENVIRONMENT, and filed on Apr. 16, 2013. As well, this application is related to: United States patent application Ser. No. 13/966,065, entitled READ WRITE ACCESS IN A READ ONLY ENVIRONMENT, and filed the same day herewith; and, to United States patent application Ser. No. 13/966,163, entitled READ WRITE ACCESS IN A READ ONLY ENVIRONMENT, and filed the same day herewith. All of the aforementioned applications are incorporated herein in their respective entireties by this reference.

FIELD OF THE INVENTION

Embodiments of the present invention relate to backing up data. More particularly, embodiments of the invention relate to systems, hardware, computer-readable media, and methods for reading and writing data in various environments.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up critical data so that in the event of a natural disaster, unauthorized access, or other events, the entity can recover any data that was compromised or lost.

Often, the backed up data is stored in a 'read only' format. However, some applications require not only read access to the backed up data, but also write access to the backed up data, that is, such applications require read-write access. Since the data is stored in a 'read only' format however, such applications are unable to perform the necessary write operations to that data.

In light of the foregoing, it would be useful to be able to provide read-write access to 'read only' data, such as backed up data for example, in such a way that the necessary read and write operations can be performed without modifying or compromising the 'read only' data in any material way.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention relate generally to recovering data for restoration to one or more targets. At least some embodiments are employed in an environment where backups are stored that can be restored to a target device or devices. More particular example embodiments of the invention relate to systems, hardware, computer-readable media and methods for defining and/or executing read and/or write processes with respect to backed up 'read only' data.

In at least some embodiments, an abstraction layer is provided that intercepts a write request directed to underlying 'read only' data. The abstraction layer can reside in any location where it is able to intercept write requests that are directed to 'read only' data which may be stored, for example, at one or more virtual machines. Such write requests can be issued by an application, and the 'read only' data may be backup data, although neither of these is required.

When the underlying data is read/written to, the abstraction layer can be instructed to either commit the data to underlying structure, that is, modify the underlying data, or dismiss the write data thereby leaving the underlying data unaltered. Since both the offsets and data for writes are known, the list of write data blocks can be walked and then written to the underlying data.

The abstraction layer operates in conjunction with a data structure, such as a balanced search tree for example, to which one or more blocks of an intercepted write request can be added, and which enables the added write blocks to be mapped for later use. In one implementation, the data structure includes the offset of a block to be written, as well as the size of that block. The payload of the block to be written may be stored remotely from the data structure. Each write block in the data structure is associated with an identifier, such as the offset for example, that uniquely identifies that particular block.

As well, each write block in the data structure is associated with a full file path that uniquely identifies a file object construct to which that block will be written. In general, the file object construct is a representation of the structure of the 'read only' data, and is stored in a hashmap in association with its unique full file path. When a 'read only' file is opened that is intended to be written to, the hashmap can retrieve the file object construct implicated by the write request and add the corresponding write blocks to the data structure.

When a read request is issued that corresponds to the file associated with the write request, the file object construct representing that file is looked up and the data structure is queried for write changes to the file object construct. The data blocks, including any write blocks, of the file object construct are then read out.

As may be evident from the preceding discussion, and other disclosure herein, embodiments of the invention may provide various advantages, although it is not necessary, or required, that any particular embodiment(s), provide any particular advantage(s). Moreover, and consistent with the foregoing, embodiments within the scope of one or more claims may additionally, or alternatively, provide one or more advantages not specifically enumerated herein. Finally, to the extent that possible advantages are enumerated herein, those may be present in one or more embodiments in any combination.

At least some embodiments of the invention may provide read-write access to 'read only' data, such as backed up data for example, in such a way that the necessary read and write operations can be performed without modifying or compromising the 'read only' data in any material way, or at all.

As well, some embodiments of the invention may provide a relatively high level of granularity in terms of the data that is written to, and read out. That is, such embodiments enable read-write operations to be performed on 'read only' data at the data block level, rather than at a file level or other level of less granularity than the data block level. In this way, such embodiments may reduce storage requirements since only the data blocks associated with the write request, and not the entire file, need be stored, and such embodiments may provide a relative increase in the speed with which read and write operations are performed. Note that as used herein, 'data block' can refer to any piece or chunk of data that is smaller than the file with which it is associated. In some instances, a data block can be as small as a single byte, but may alternatively comprise a plurality of bytes.

A. Example Operating Environments

FIG. 1a-1d disclose example configurations and environments of embodiments of the invention, such as example operating environment 100. The environment 100 may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. Moreover, any combination of the elements indicated in FIG. 1a-1d may be implemented in a cloud or internet environment or other networked environment.

As indicated in FIG. 1a-1d, the example environment 100 includes a backup server 200 configured for communication with one or more clients 300, and one or more target machines 400. In general, backups created in connection with the backup server 200 can be restored to the client 300 and/or the target machine 400. The client 300 and/or the backup host 400 may be physical machines, virtual machines, or any other suitable type of device. Additionally, one or more hosts 500 may be present in the operating environment 100.

With particular reference first to the backup server 200 and the client 300, the backup server 200 generally operates to create, or cause the creation of, one or more backups of data that is resident at the client 300. In some implementations, the backup server 200 is an EMC Corp. AVAMAR server or NetWorker server, although the scope of the invention is not limited to those example servers. The backup server 200 operates in conjunction with a backup application 302, which is a data de-duplication application in some embodiments, of the client 300 to backup data residing on storage media 304, such as disks for example, of the client 300. The backups thus created, which comprise de-duplicated backups in some embodiments, are stored on the storage media 202 of the backup server 200. The backups may be restored to the client 300 and/or to storage media 402 of the target machine 400, and/or to any other machines.

As noted above, the environment 100 may include one or more hosts 500. The number of hosts 500 in the environment 100 can vary, and the hosts can be of different types. In one example, one or more hosts 500 may all be part of the same network or associated with the same entity. The one or more hosts 500 can include, by way of example only, servers (e.g., a file server, an email server), computers (e.g., desktop computers, laptop computers, tablet devices, smartphones), virtual machines, databases, or any combination thereof. Each of the one or more hosts 500 can be associated with its own data. As well, a host 500 may generally be any device that includes one or more applications which require read-write access to a backup, such as the backups residing at the backup server 200. As such, the host 500 or any other device that requires read-write access to 'read only' data, which may or may not be backup data, may transmit both read and write requests concerning that 'read only' data.

In the examples of FIG. 1a-1d, the host 500 is a machine, such as a computing device, that includes a memory 502, one or more processors 504, storage media 506, and I/O device 508, data storage 510. As well, one or more applications 512 are provided that comprise executable instructions. One or more of the target machine 400, client 300 and backup server 200 may likewise include any one or more of the aforementioned elements of example host 500, in any combination.

B. Example Abstraction Layers

Figure 1A:
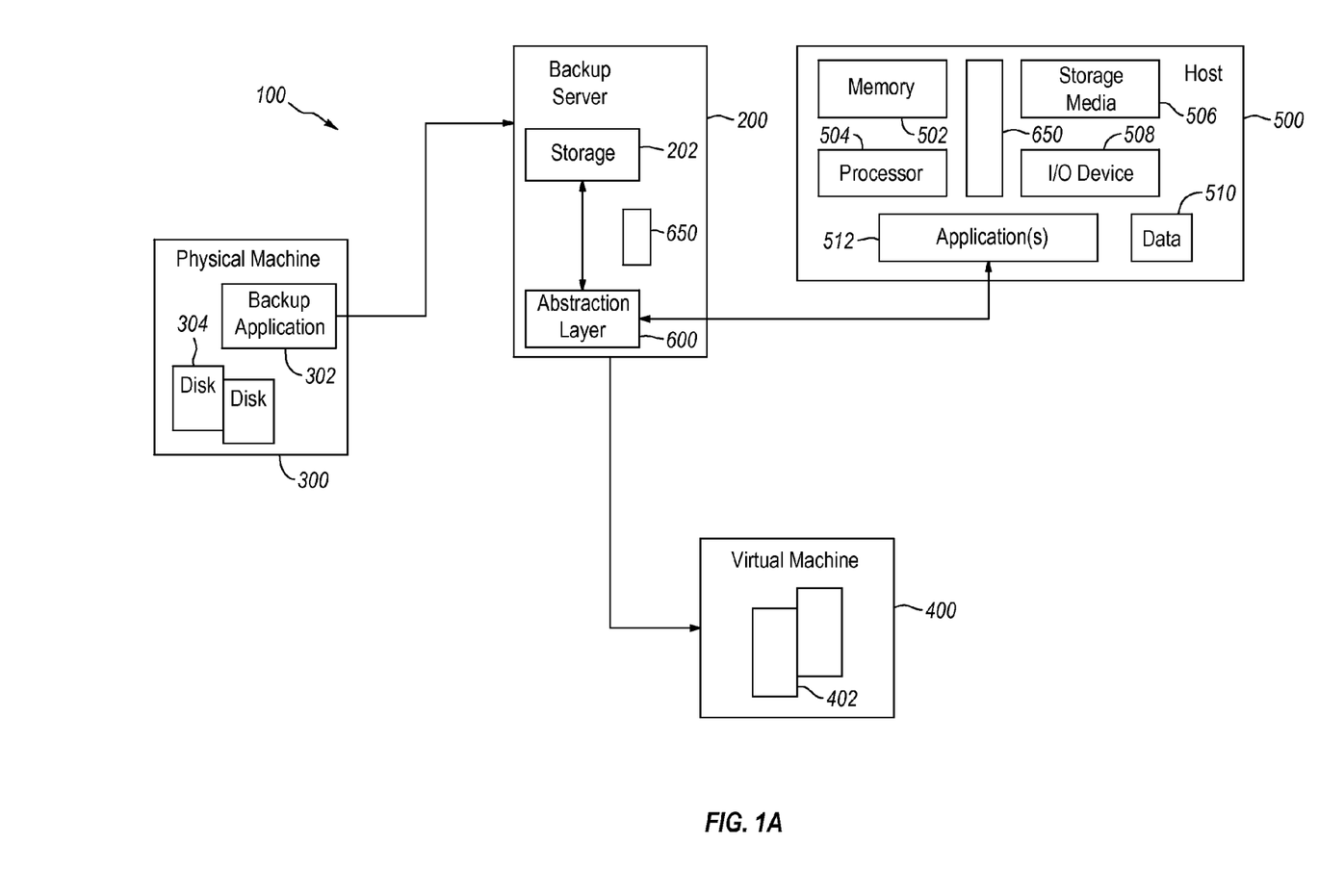
FIGS. 1a-1d are directed to different example environments and configurations of embodiments of the invention.

With continued reference to FIG. 1a-1d, and particular reference to FIG. 1a, the example implementation in that figure further includes an abstraction layer 600. In general, the abstraction layer 600 intercepts write requests directed to 'read only' data, such as a backup for example, and creates, or enables the creation of, one or more file object constructs, discussed in more detail elsewhere herein, that mimic the structure and content of the 'read only' data to which the write request is directed. When a 'read only' file is opened for modification, the file object construct(s) associated with the write request are modified, if necessary, to include the data blocks of the write request.

Thus, the abstraction layer, through the file object constructs, can be thought of as virtualizing 'read only' data and/or any other data whose integrity is desired to be preserved, so as to enable the originator of the write request to manipulate a representation of the 'read only' data in any desired manner, including viewing, reading, writing, and deleting, but without actually touching the actual underlying data. This functionality can be useful in a variety of circumstances. By way of illustration, this functionality allows testing to be performed with respect to the 'read only' data without any risk to the integrity of that data. Finally, and as noted elsewhere herein, the abstraction layer 600 functionality is not limited to interception of write requests. The abstraction layer 600 may also enable a user to both dismiss the write request, that is, leave the underlying 'read only' data unmodified, and to commit, that is, write, the write blocks to the underlying data with, as/if desired.

Generally, the abstraction layer 600 can be configured in any way that enables it to intercept write requests directed to 'read only' data. As such, the abstraction layer 600 is not required to reside in any particular device or location. In some instances, the 'read only' data is a backup, but that is not necessary. More generally, the abstraction layer 600 can be employed in connection with any 'read only' or 'read-write' files and systems where it is desired to be able to avoid changes to the underlying data. Other examples of 'read only' data, and associated applications, in connection with which embodiments of the invention may be employed include, but are not limited to full backups, partial backups, snapshots, mirrored copies and de-duplicated backups. In some instances, a single abstraction layer can serve multiple applications and/or 'read only' data stores while, in other instances, an abstraction layer may be employed for each of multiple different applications and/or 'read only' data stores.

The abstraction layer 600 may be controlled by the application generating the write requests and/or by the backup server that receives the write requests. Additionally, or alternatively, the abstraction layer 600 may be controlled by a host or other device on which it resides, if that host or other device is other than the backup server or the host of the application(s) issuing the write requests. The application(s) generating write requests can be virtually any application. Examples include, but are not limited to, snapshot applications, testing applications, and any other application that may require writing to 'read only' data in a backup.

In the particular example of FIG. 1*a*, the 'read only' backup data is located at storage 202 of the backup server 200. Thus, the abstraction layer 600 is configured to intercept write requests from the application(s) 512 directed to that backup data. Here, the abstraction layer 600 is located in the backup server 200, as indicated. As such, the operation of the abstraction layer 600 is controlled by the backup server 200. It should be noted that the abstraction layer 600 in the arrangement of FIG. 1*a* may intercept write requests to any number of different backups or other 'read only' data resident on the backup server 200, some or all of which may reside in storage 202 and/or other storage (not shown) associated with the backup server 200.

Figure 1B:
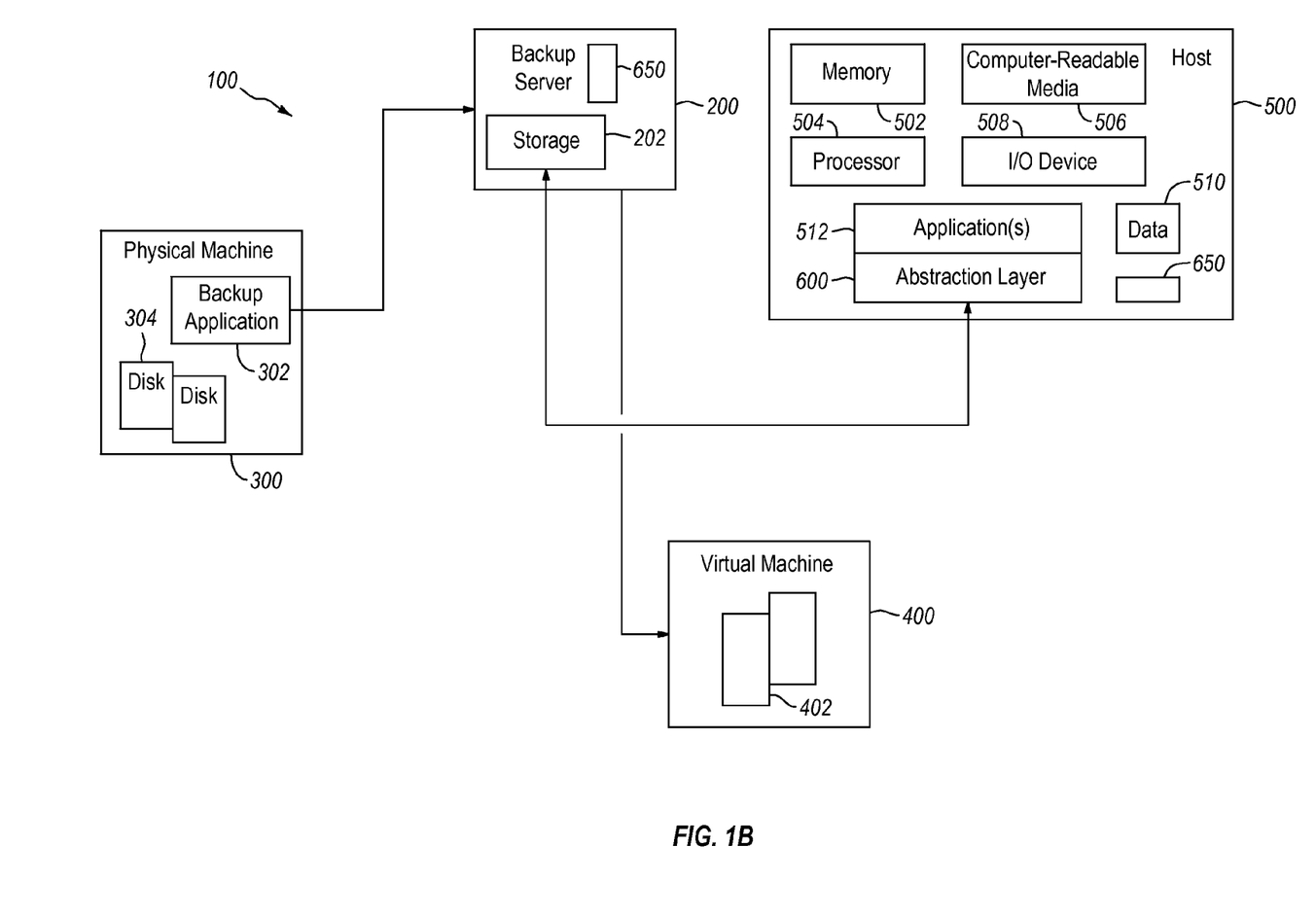

With attention now to FIG. 1*b*, an alternative configuration involving the abstraction layer 600 is disclosed. In this example, the abstraction layer 600 resides in the host 500 and, as such, the operation of the abstraction layer 600 is controlled by the host 500. Thus configured, the abstraction layer 600 is able to intercept write requests from the application(s) 512 directed to the backup data residing at the backup server 202. As indicated in FIG. 1*b*, and noted above, the abstraction layer 600 may operate in conjunction with multiple applications 512.

Figure 1C:
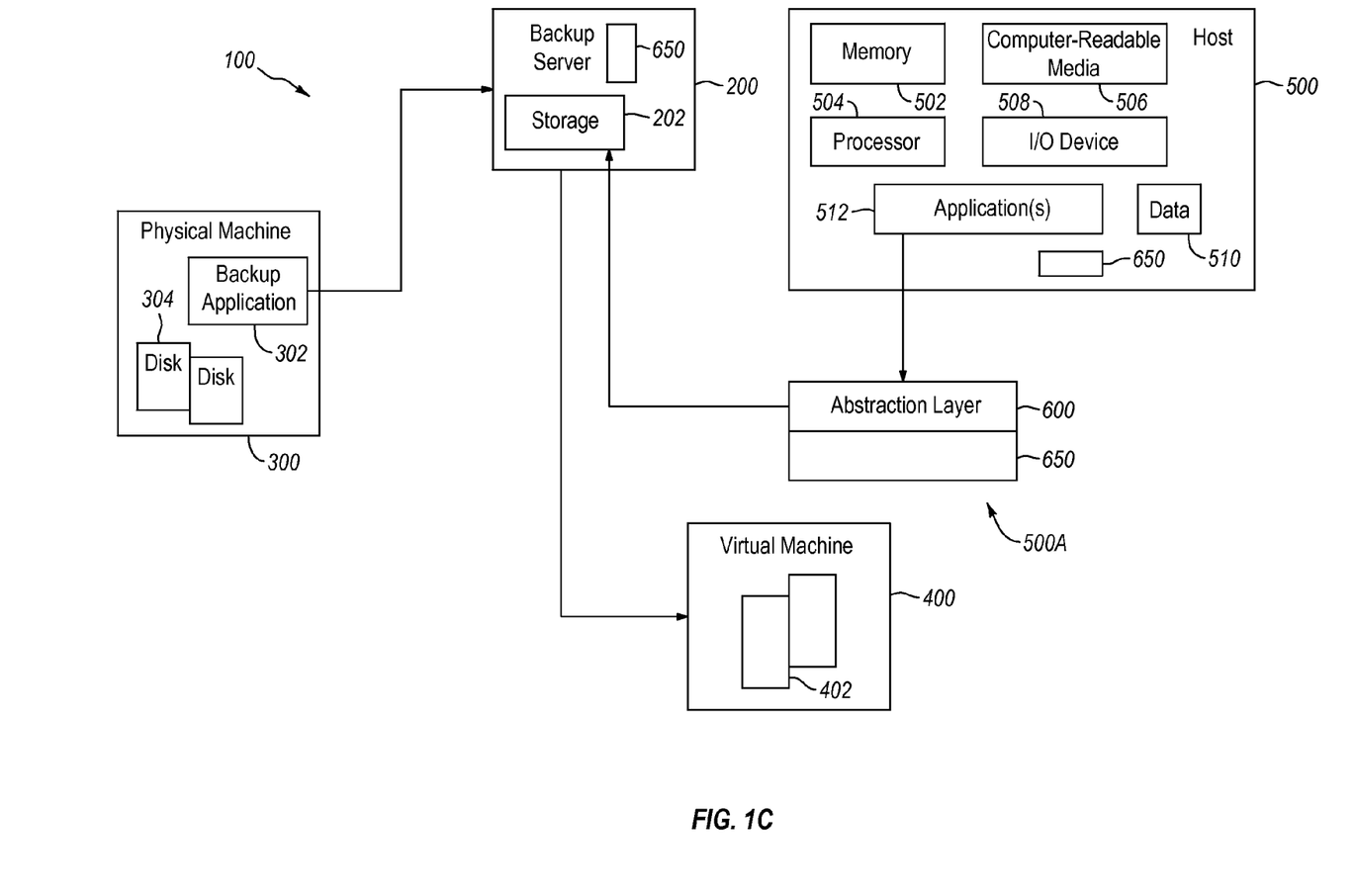

Turning now to FIG. 1*c*, a further alternative configuration involving the abstraction layer 600 is disclosed. In this example, the abstraction layer 600 resides neither at the backup server 200, nor the host 500, but some other location separate from the backup server 200 and the host 500. For example, the abstraction layer 600 may reside at, and by controlled by, a host 500A. As is the case with the other arrangements disclosed herein, the abstraction layer 600 may serve multiple hosts 500 and/or applications 512, in connection with one more backups stored at one or more backup servers 200.

Figure 1D:
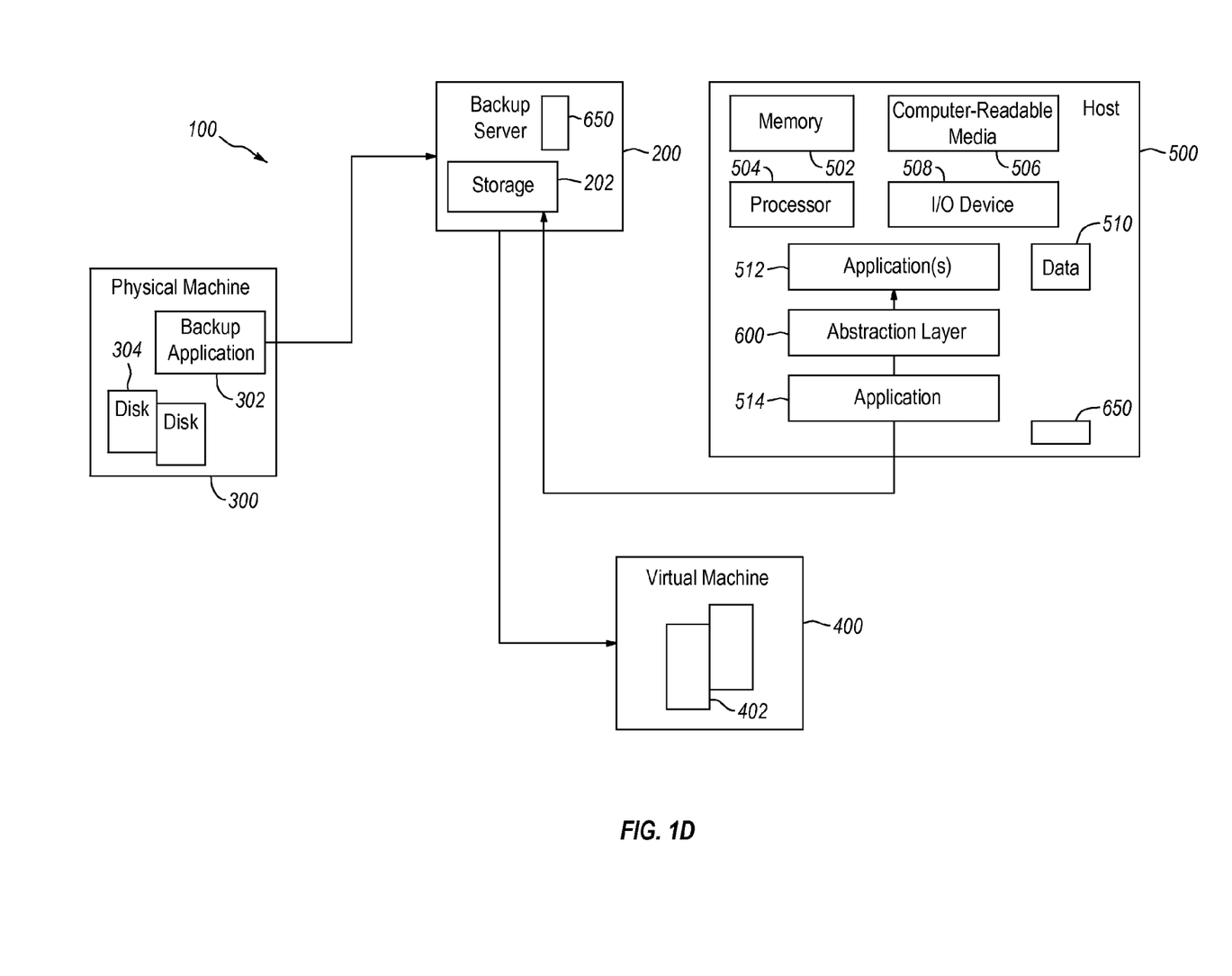

With reference finally to FIG. 1*d*, a further alternative configuration involving the abstraction layer 600 is disclosed. In this example, the abstraction layer 600 resides between first and second applications 512 and 514, respectively, of a host 500. In one variation of this arrangement, the application 514 resides other than at the host 500, such as the host 500A (FIG. 1*c*) for example, or some other location. In the arrangement of FIG. 1*d*, the abstraction layer 600 may intercept write requests issued by the first application 512 to the second application 514 so that the write request can be processed prior to the time that the application 514 communicates with the backup server 200. In a variation of the arrangement of FIG. 1*d*, both applications 512 and 514, as well as the abstraction layer 600, may be located separately from the backup server 200 and host 500.

C. File Object Constructs and Virtualized Data

Figure 2A:
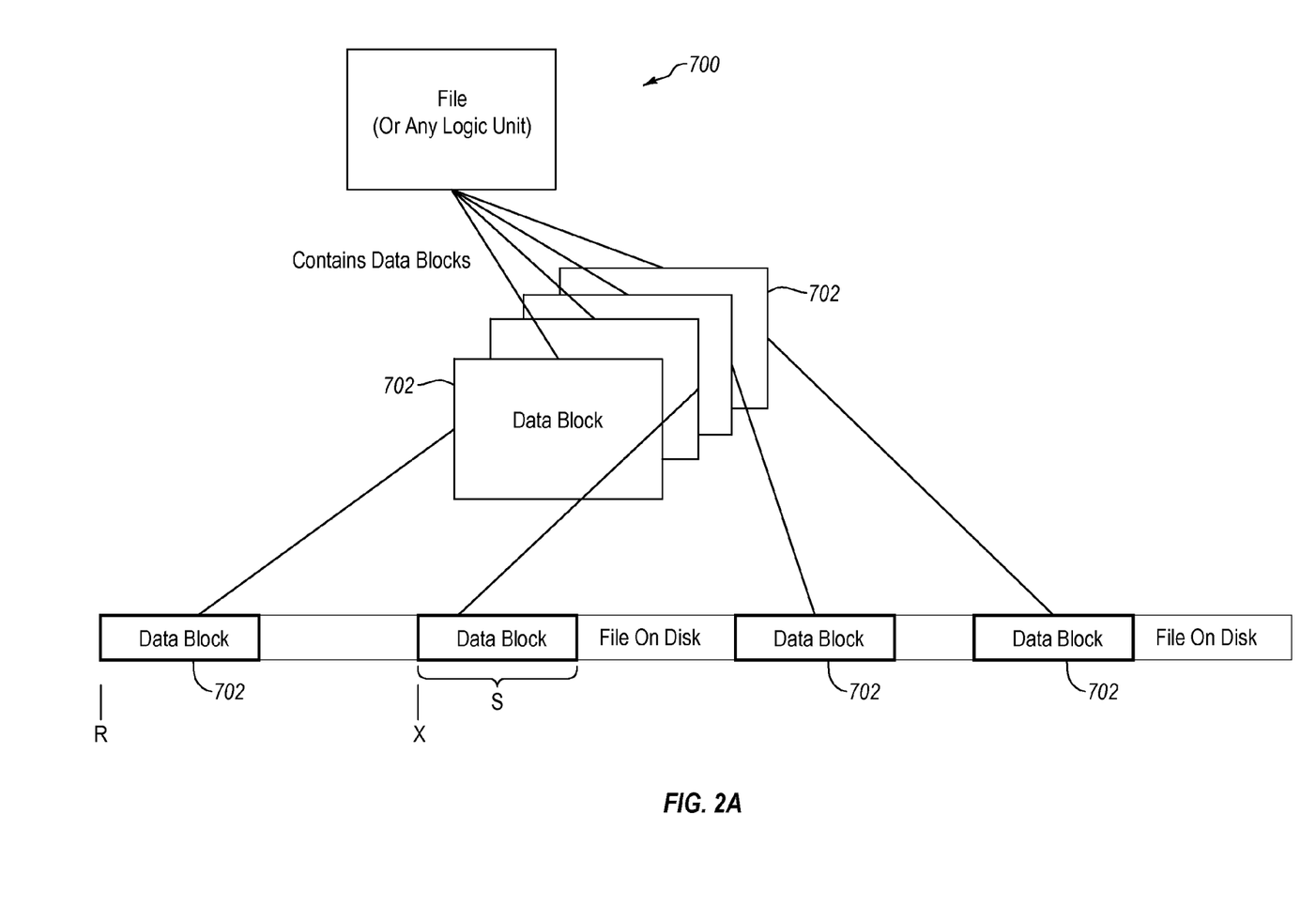
FIG. 2a discloses an example of a portion of a file on storage media.

As disclosed elsewhere herein, example embodiments of the abstraction layer create, or cause the creation of, a representation of stored 'read only' data, such as file 700 of FIG. 2*a*. In at least some embodiments, this representation is implemented as a file object construct, an example of which is disclosed in FIG. 2*b*. To facilitate the present discussion, the file object construct, a search tree, and hashmap are collectively designated as 650 and stored as indicated in the figures, though it should be understood that these elements need not be stored together and, rather, can be allocated in any fashion amongst any of the devices in the environment 100. Moreover, one or more of the file object construct, search tree and hashmap may persist for a period of time after being created and used, while the other(s) of the file object construct, search tree and hashmap may not be retained after use. In general, the file object construct is created by the abstraction layer upon the first requested write to the 'read only' data.

In terms of their lifespan, the file object constructs can persist even after a read request involving them has been completed. In at least some instances, one or more of the file object constructs persist for the life of a given invocation of the abstraction layer. Thus, during a particular usage period of the abstraction layer, the file object constructs are preserved so that they need not be created for subsequent writes in that particular usage period, but once the usage period is completed, the file object constructs can be flushed, thereby freeing memory space.

As noted above, the file constructs, hashmap and search tree can be stored in memory, for example, at the backup server or other device where the associated 'read only' data resides, or can be stored at the host of the application(s) that issue the write requests. By storing these elements in memory, access to the 'read only' data may proceed relatively faster than if those elements were handled differently. However, it is not required that such elements be handled this way. For example, this arrangement could be changed so that one, some or all of those elements can be saved to a file when the abstraction layer is shut down, and then read back into memory on startup of the abstraction layer, thereby restoring the last known state prior to shut down, all while leaving the underlying data intact.

Figure 2B:
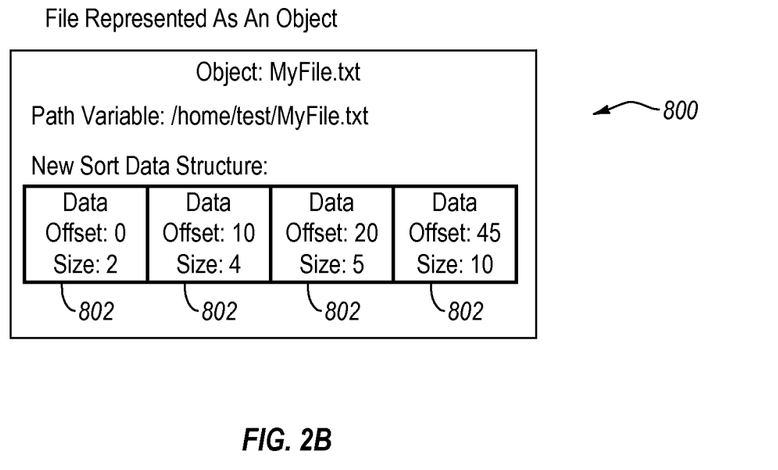
FIG. 2b discloses an example embodiment of a representation of 'read only' data that can be used to enable a write process.

With the foregoing in view, attention is directed now to an example file 700 and associated file object construct 800, disclosed in FIGS. 2*a* and 2*b*, respectively. As indicated in FIG. 2*a*, the file 700 includes one or more data blocks 702, each of which is uniquely identified by its offset "X," namely, the distance from the start of the data block 702 to a reference "R" of the file 700. Each data block 702 additionally has a size "S" which can be expressed, for example, in terms of bytes. Thus, when a write to file 700 is specified, the location of the data blocks 702 to be written to the file object construct 800 can be determined by referring to the respective offset associated with each data block 702 of the write request. As well, the relationship between the write data block 702 and data blocks 802 already present in the file object construct 800 can be considered and determined in terms of the size and offset of each data block.

It was noted earlier that each data block of a write request includes or is associated with a respective payload. Typically, although it is not necessarily the case, the data block payloads are stored apart from the file object construct 800. For example, the data block payloads can be stored in memory at the server or other device where the 'read only' data resides, or the data block payloads can be stored at the host of the application that issues the write request, or the data block payloads can be stored in any other suitable location.

Turning now to FIG. 2b, the file object construct 800 with its data blocks 802 serves as a representation of the underlying 'read only' data 702 of the file 700. The file object construct 800 can represent all, or only a portion, of the file 700. In general, the file object construct 800 can be modified with write requests, without disturbing the underlying data 702 of the file 700. As further indicated in FIG. 2b, the file object construct 800 may have any suitable name, such as 'MyFile.txt' for example, and can be uniquely identified by its full path, for example. In the example of FIG. 2b, the full path of the file object construct 800 is '/home/test/MyFile.txt.' Finally, the file object construct 800 is configured in such a way that successive data blocks 802 are positioned adjacent to each other, notwithstanding that their different offsets and sizes could result in overlap if the blocks 702 of the actual file 700 were positioned in that way on the storage media.

D. Search Tree and Hashmap

As noted earlier, and with reference now to FIG. 3, the abstraction layer operates in conjunction with a data structure 900, such as a balanced search tree for example, to which one or more data blocks of an intercepted write request can be added, and which enables the added write blocks to be mapped for later use. The data structure 900 may comprise, or access, an array or other element that enables rapid access to the information contained in the data structure 900.

Figure 3:
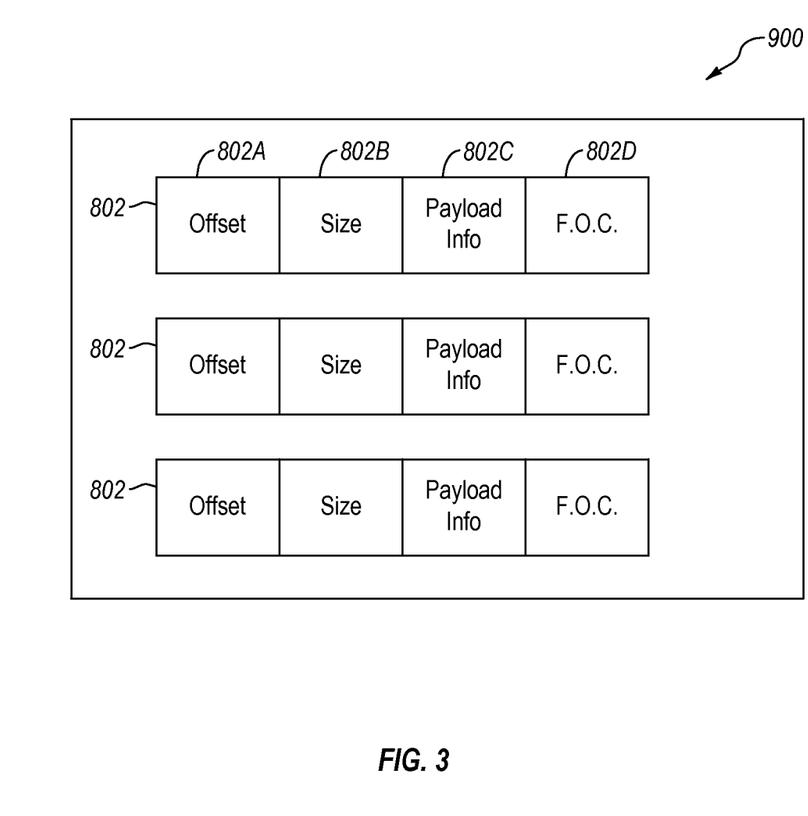
FIG. 3 discloses an example of a data structure that can be used to map and store data blocks.

In one implementation, the data structure 900 includes information such as the offset of a block to be written, as well as the size of that block. The payload of the block to be written may be stored remotely from the data structure 900. Each write block in the data structure 900 is associated with an identifier, such as the offset for example, that uniquely identifies that particular data block.

Figure 4:
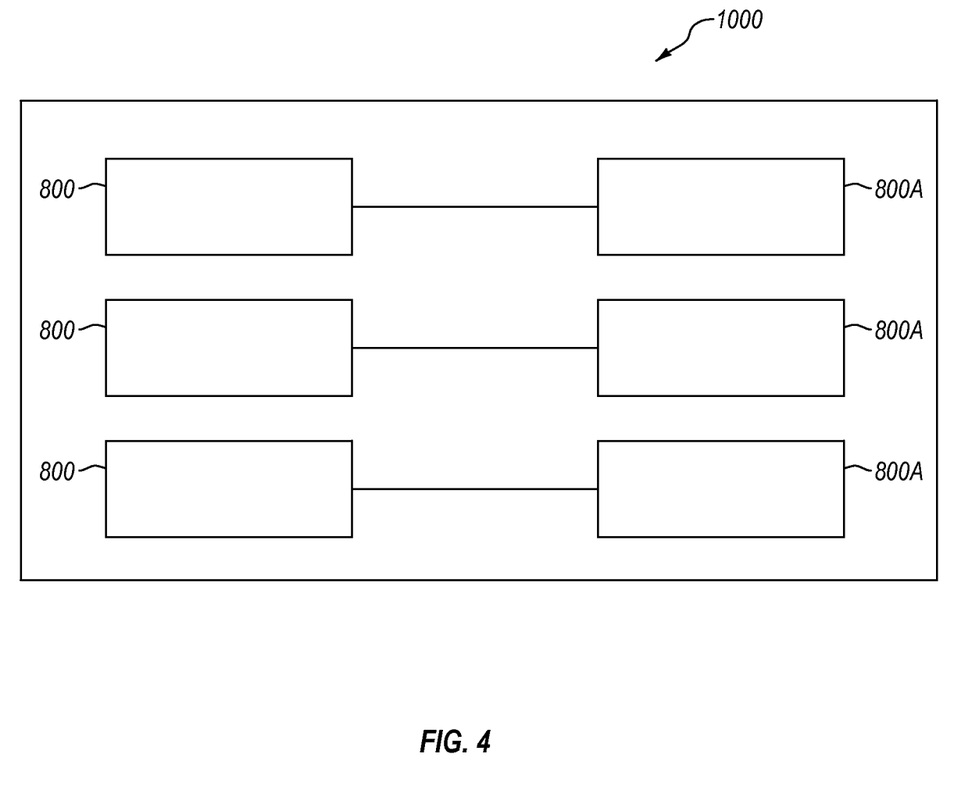
FIG. 4 discloses an example of a hashmap that can be used to map and store file object constructs.

With continued reference to FIG. 3, and direction attention now to FIG. 4, each of the file object constructs 800, discussed elsewhere herein, can be stored in a hashmap 1000 in association with a unique identifier, such as its full file path 800A. When a 'read only' file is opened that is intended to be written to, the hashmap 1000 can retrieve the file object construct(s) 800 implicated by the write request and add the corresponding write blocks to the corresponding file object construct 800.

E. Example Methods

Figure 5:
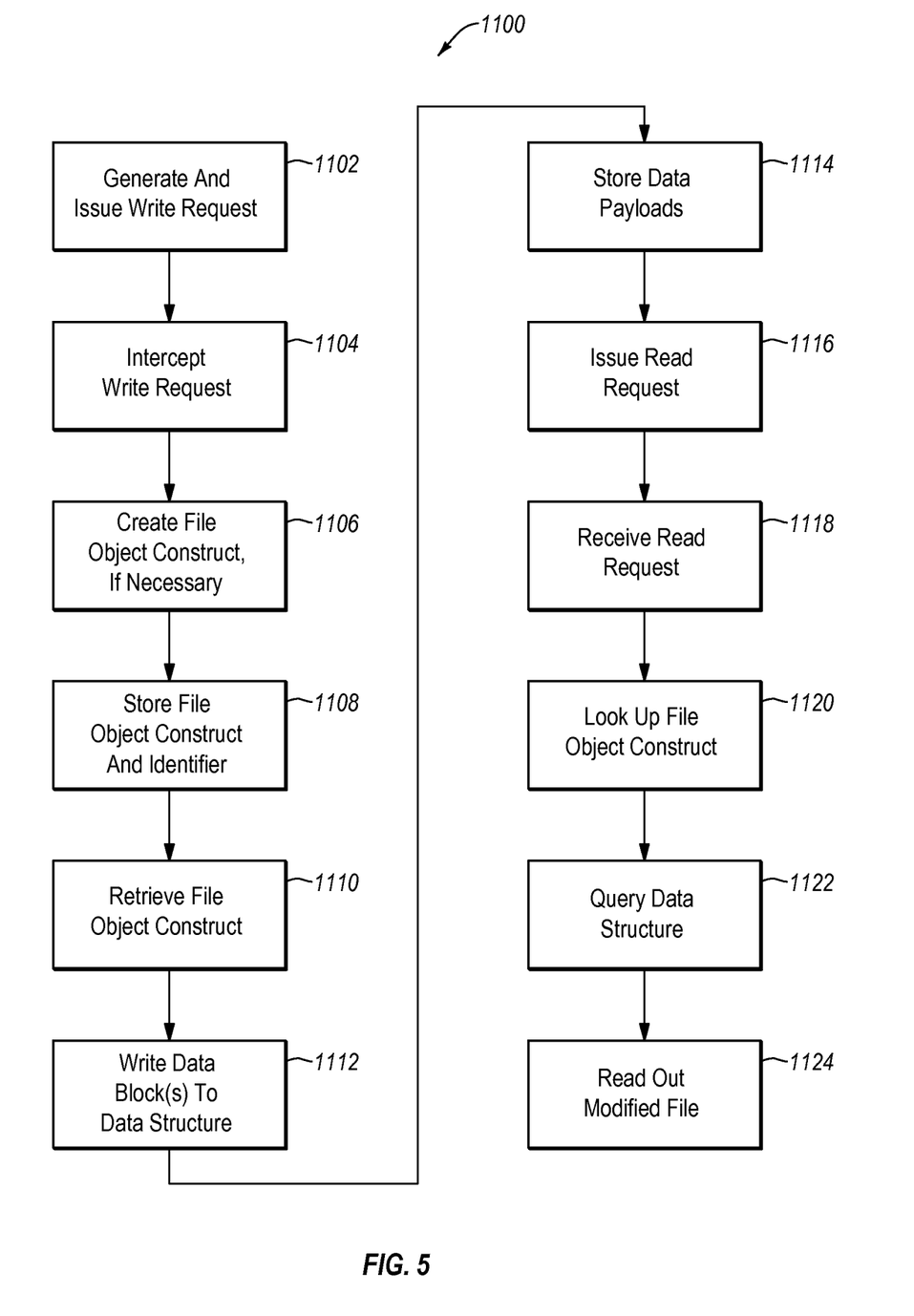
FIG. 5 discloses an example process for implementing read-write functionality with respect to read-only data.

Directing attention now to FIG. 5, details are provided concerning an example process 1100 for facilitating read-write access in a 'read only' environment. It should be noted that the processes below can be performed by a variety of entities at various times and in various environments. Accordingly, the processes, and combinations thereof, set forth below are presented solely by way of example.

The process 1100 begins at 1102 where a write request is generated and issued, such as by an application for example, that is directed to 'read only' data. The write request may include as few as a single data block. In addition to one or more data blocks, the write request may include a unique identifier, such as offset information, for each data block, and a data payload for each data block.

At 1104, the write request is intercepted by an abstraction layer. In general, in response to a write request, the abstraction layer can be instructed to either commit the data associated with the write request to underlying structure, that is, modify the underlying 'read only' data, or dismiss the write data, thereby leaving the underlying 'read only' data unaltered. Since both the offsets and data for writes are known, as discussed elsewhere herein, the list of write data blocks can readily be walked and then written to the underlying 'read only' data.

If no write operations have previously been performed concerning the file to which the write request is directed, a file object construct is created at 1106 by, or at the direction of, the abstraction layer, and is then stored 1108 in association with an identifier that is unique to that file object construct. On the other hand, if a check reveals that one or more write operations concerning the file to which the write request is directed have already been performed, a file object construct for that file already exists and need not be created in response to the more recent write request(s).

In general, and as discussed in more detail elsewhere herein, the file object construct is a representation of the 'read only' file to which the write request is directed. In some embodiments, the file object construct is stored in a hashmap, or comparable structure, in association with its unique full file path, although the scope of the invention is not limited to this illustrative example. Thus, when a 'read only' file is opened that is intended to be written to, the hashmap can retrieve 1110 the file object construct, whether already existing or newly created by the abstraction layer, implicated by the write request. By retrieving the appropriate file object construct, the hashmap can then store data blocks in a data structure, discussed below, in such a way that the data blocks are mapped to that file object construct.

Then, whether a file object construct exists, or is newly created in response to the write request, the data block(s) contained in, or implicated by, the write request are added 1112 by the hashmap to a data structure as part of a write process so as to enable the added write blocks to be mapped for later use. One example of such a data structure is a balanced search tree backed by a continuous data array, although the scope of the invention is not limited to the use of balanced search trees. In this way, a representation of 'read only' data can be modified as desired by a user without disturbing or compromising the actual 'read only' data that is so represented.

As part of the process of writing data blocks to the data structure, the respective offset of each data block, or other unique identifier for each data block, as well as the respective size of each data block, can be written to the data structure in such a way that the offset and size of each data block are stored in association with their respective data block. As well, each write block in the data structure is stored in the data structure in association with a full file path that uniquely identifies the file object construct pulled by the hashmap and to which that block will be written. By storing the write blocks in this way, constant time data access is possible.

At 1114, the data payload associated with each write block of the write request is stored. In some embodiments, the data payloads are stored separately from the data block, offset, and size information, although that is not required. The data payloads can be stored 1114 before, after, or contemporaneously with, their respective data block, offset and size information.

Once the aforementioned elements of the process 1100 have been employed to implement write operations concerning 'read only' data, a read request can then be issued 1116, by an application for example, with respect to that 'read only' data. When a read request is received 1118 that corresponds to the file associated with the write request(s), the file object construct representing that file is looked up 1120 and the data structure is queried 1122 for write changes to the file object construct. The data blocks, including any write blocks specified by write requests, of the file object construct are then read out 1124. In this way, the read requestor is able to access a representation of underlying 'read only' data that reflects one or more write requests directed to that underlying data, even if that underlying data has not itself been modified.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for facilitating read-write processes in a read-only environment, the method comprising:
    intercepting a write request directed to underlying read-only data, the write request including a data block;
    creating a file object construct that is a virtualization of the underlying read-only data which represents the underlying read-only data as an object;
    storing the file object construct in memory in association with an identifier that is unique to the file object construct;
    writing the data block of the write request to a data structure that is configured to organize data, the data block being mapped to the file object construct, and wherein no change is made to the underlying read-only data as a result of the writing of the data block; and
    in response to a read request from a read requesting entity, the read request corresponding to the underlying read-only data to which the write request was directed, the file object construct is looked up and the data structure queried for write changes to the file object construct, and one or more data blocks of the file object construct, including the data block of the write request, are read out to the read requesting entity.

2. The method as recited in claim 1, wherein the write request is associated with an application.

3. The method as recited in claim 1, wherein a payload of the write request data block is not written to the data structure.

4. The method as recited in claim 1, wherein the file object construct is created by an abstraction layer in response to a first requested write to the read-only data.

5. The method as recited in claim 1, wherein the write request is intercepted by an abstraction layer.

6. A non-transitory storage device having stored therein computer-executable instructions which, when executed by one or more hardware processors of a computing system, facilitate read-write processes in a read-only environment, wherein facilitating read-write processes in a read-only environment comprises:

intercepting a write request directed to underlying read-only data, the write request including a data block;

creating a file object construct that includes virtual data that is a virtualization of the underlying read-only data which represents the underlying read-only data as an object;

storing the file object construct in memory in association with an identifier that is unique to the file object construct;

writing the data block of the write request to a data structure that is configured to organize data, the data block being mapped to the file object construct, and wherein no change is made to the underlying read-only data as a result of the writing of the data block; and in response to a read request from a read requesting entity, the read request corresponding to the underlying read-only data to which the write request was directed, the file object construct is looked up and the data structure queried for write changes to the file object construct, and one or more data blocks of the file object construct, including the data block of the write request, are read out to the read requesting entity.

7. The non-transitory storage device as recited in claim 6, wherein the write request is associated with an application.

8. The non-transitory storage device as recited in claim 6, wherein a payload of the write request data block is not written to the data structure.

9. The non-transitory storage device as recited in claim 6, wherein facilitating read-write processes in a read-only environment further comprises initializing an abstraction layer.

10. The non-transitory storage device as recited in claim 9, wherein the write request is intercepted by the abstraction layer.

11. The non-transitory storage device as recited in claim 6, wherein a data payload of the data block in the write request is stored separately from the data block, a data block offset, and data block size information.

12. A backup server, comprising:
a backup application;
one or more hardware processors;
data storage holding underlying read-only data;
an abstraction layer; and
computer-executable instructions which, when executed by one or more of the hardware processors, facilitate read-write processes in a read-only environment, wherein facilitating read-write processes in a read-only environment comprises:

intercepting, with the abstraction layer, a write request directed to the underlying read-only data, the write request including a data block;

causing, with the abstraction layer, the creation of a file object construct that is a virtualization of the underlying read-only data which represents the underlying read-only data as an object;

storing the file object construct in memory in association with an identifier that is unique to the file object construct; and writing the data block of the write request to a data structure that is configured to organize data, the data block being mapped to the file object construct, and wherein no change is made to the underlying read-only data as a result of the writing of the data block; and in response to a read request from a read requesting entity, the read request corresponding to the underlying read-only data to which the write request was directed, the file object construct is looked up and the data structure queried for write changes to the file object construct, and one or more data blocks of the file object construct, including the data block of the write request, are read out to the read requesting entity.

13. The backup server as recited in claim 12, wherein the underlying read-only data includes a file.

14. The backup server as recited in claim 12, wherein the write request is associated with an application.

15. The backup server as recited in claim 12, wherein facilitating read-write processes in a read-only environment further comprises initializing an abstraction layer.

16. The backup server as recited in claim 12, wherein the file object construct is created in response to the first requested write to the read-only data.

* * * * *